May 22, 1951　　　　J. F. DREYER　　　　2,553,961
LAMINATED POLARIZER
Filed Nov. 14, 1947
Fig. 1.
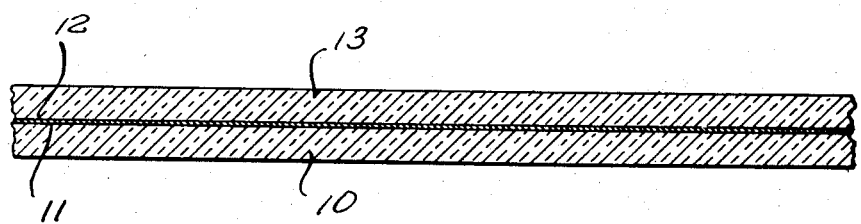
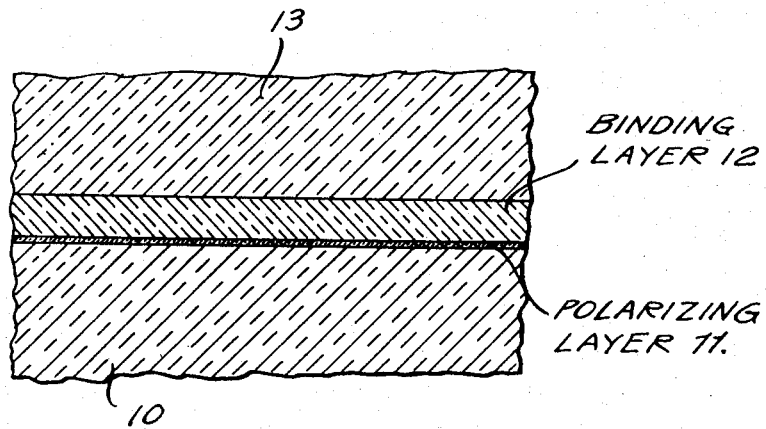
Fig. 2.
Inventor
JOHN F. DREYER
By Curtis, Morris & Safford
Attorney Patented May 22, 1951

2,553,961

UNITED STATES PATENT OFFICE 2,553,961

LAMINATED POLARIZER

John F. Dreyer, Cincinnati, Ohio

Application November 14, 1947, Serial No. 785,859

6 Claims. (Cl. 88—65)

This invention relates to light-polarizing material and to methods of forming the same. This application is a continuation-in-part of my co-pending application Serial No. 669,699 filed May 14, 1946 (now Patent No. 2,524,286, October 3, 1950), and of my copending application Serial No. 407,720 (now Patent No. 2,432,867) which was filed August 21, 1941, as a continuation-in-part of my copending applications Serial Nos. 217,249, 263,779, both abandoned, and 384,550 (now Patent No. 2,400,877, May 28, 1946).

In the formation of a wide number of types of both flat window panes, lenses and the like, of glass or other transparent plastic, of which automobile windshields, automobile-light lenses, watch and instrument crystals, instrument-panel windows, and eyeglass lenses are outstanding examples, it is often desirable to have a layer of glass or other transparent material made non-shatterable by lamination, an art which is now well developed. It is also frequently desirable to have such windows and crystals, etc. made of a light polarizing material; and it has heretofore been suggested to include polarizing crystals in the bonding material of a glass laminate with the glass sheets on each side of the layer of light-polarizing material. The presence of such crystals tends to deteriorate the quality of the bonding material for its primary function; and the presence of the plastic, which has been oriented in the process of orienting the crystals therein, deteriorates the quality of said material for its light-polarizing function. It is an object of the present invention to provide an improved transparent laminate having a transparent protecting sheet on each side and the polarizing material between them, but with both polarizing material and bonding material designed to serve with high efficiency and not used in any compromise mixture.

With this and other objects in view, which will be apparent from the following specification and claims, the invention contemplates the use of a nematically-formed film of the type described and claimed in my Patent No. 2,400,877 and the copending applications Serial Nos. 669,697 (now Patent No. 2,481,830, September 13, 1949), 669,698 and 669,699 filed May 14, 1946 (now Patents Nos. 2,544,659, March 13, 1951, and 2,524,286, October 3, 1950, respectively), and Serial No. 745,267 filed May 1, 1947, directly adherent to one of the laminations, on which it is formed, and a bonding material on said film, and a cover sheet held by the bonding material to said film and through it to the first mentioned lamination. It is altogether surprising that such a structure can be made as a strongly adherent laminated unit. Previous experience with dye films dried on glass or like surfaces had given no indication that they could be regarded as adhesives or bonding materials; and, although the use of the films described in my said patent and applications has shown them to adhere sufficiently for many purposes it has been found better to protect them against scraping and abrasion; and thin as they are, it has even been found possible to strip them from the base on which they are formed.

Even with the best constructions at least one plane of cleavage has tended to develop in the laminated assembly. For example, when subjected to the standard steel-ball drop test, a plate glass laminate with my polarizing film on the inner surface of one and a standard laminating resin composition has tended to shatter free at the interface between the film and the bonding resin, this condition being present particularly at low temperatures. Such a "sandwich" is useful for many purposes and even for windshields and the like may be used with the film on the outer glass and the bonding resin on the inner glass, where it will curve to hold splinters against flying into the interior of the car. I have now found, however, that the tendency of the glass to shatter free from polarizing film can be substantially overcome by heating the polarizing film prior to laminating, for a sufficient time and at a temperature sufficient to assure thorough dehydration of the film. I have found that polarizing films, if subjected to such drying, will lose up to 85% of their weight without showing any difference in their polarizing effect.

With the foregoing and other considerations in view the present invention contemplates the provision of a polarizing laminate which omits without loss of its important function one of the binder layers always considered necessary in previous polarizing laminates. In accordance with the invention the layer of polarizing material is held to one of a pair of sheets of glass or the like not by an adhesive, but by direct molecular attraction due to the method of forming the firm thereon.

Further in accordance with the invention there is provided an improved and simplified process wherein the polarizing layer is adhered directly to the surface of glass or the like in situ and indirectly by a binder to another glass surface or the like to form a polarizing laminate; and in accordance with the invention in its more specific aspects, there is provided a procedure wherein the adhesion of the laminations is enhanced by drying the polarizing film in situ prior to the application of the binder.

The polarizing substance should be directly in contact with the surface of the glass or the like rather than dispersed in, or mounted on, a resin or other binder which to some extent is interposed between the polarizing layer and the binder. Instead of glass other solid pellucid (transparent or translucent) materials may be employed. Ordinarily, it is more advantageous to use transparent materials and for some purposes it is essential, but in certain instances where diffuse polarized light is required it is more advantageous to use a translucent material on at least one sheet. If the translucent material is arranged in the path of the polarized light it should preferably be of a type such as ground glass which diffuses by a single refraction of each ray rather than one which gives multiple reflections from surfaces of particles or bubbles dispersed therein. Except where elliptical polarization is desired, this material through which the polarized light passes, binder as well as the glass or the like, should not be anisotropic, i. e., one should avoid a fractional wave-plate effect such as occurs with stretched plastics.

As I have disclosed in my prior patent and applications above referred to, various plane-polarizer materials, especially certain dyes, are in themselves when molecularly oriented, capable of polarizing light or are capable of being readily converted into dichroic (which term is used herein in its generic sense to include pleochroic) materials capable of polarizing light. These are materials which exhibit a nematic state. These materials may be applied and oriented by first rubbing the surface which is to become the polarizing surface uniformly along the line or lines on which the polarizing material is to be oriented and subsequently applying the polarizing or polarizable material in a liquid film, preferably as an isotropic solution, and then bringing it into the nematic state wherein it is oriented along the lines of rubbing by a field effect resulting from the rubbing. It is then quickly and uniformly solidified from the nematic state without ebullition, so as to set the nematic orientation before any reorientation or de-orientation due to crystallization, can occur and without other disturbance of the molecules. I use the term "polarizable" herein to include not only materials which, when properly oriented, are inherently capable of polarizing light passed therethrough, but also materials which may be made capable of polarizing light by a subsequent treatment which does not disturb their orientation.

As polarizing materials, I have found dichroic dyes particularly satisfactory. For instance, naphthol yellow S—color index No. 10, toluidine blue—color index No. 925, diphenyl fast blue 4GL supra—color index No. 533, amaranth—color index No. 184, methylene blue—color index No. 922, and other of the polarizable materials mentioned in the above named patents have given excellent results. The color index numbers are those given in the Year Book of the American Association of Textile Chemists and Colorists.

Any of a wide variety of types of transparent (or translucent) binders may be employed. Polyvinyl acetals, especially polyvinyl butyral films serve effectively, the latter giving particularly good adhesion when formed by the polyvinyl alcohol process as described on page 380 of Wakeman's "The Chemistry of Commercial Plastics."

It may be applied in solution of isopropanol—a 4% solution giving good results—benzol, or other suitable solvent which is a non-solvent for the polarizing material. Cellulose acetate, acryloid A-10, acroloid B-72 and Canada balsam are other examples of materials which may be used as the binder in this invention.

The binder may be applied in a variety of ways, as by interposing a heat-softenable film of the binder or by painting, or flooding, with a melt or solution of the binder, for example; and, in the broader aspects of the invention, may be applied to the polarizing film, or to the glass surface to be superposed thereon, or both. The temperature may be considerably below or above room temperature, care being taken, however, not to use a temperature high enough to dissolve, liquify, or otherwise damage the polarizing layer.

Various effective manners of formation of the polarizing layer on glass or the like are set forth in my Patent 2,400,877 to which reference may be had. Advantageously, the surface may be rubbed along the lines of orientation with a high melting point powder such as calcium carbonate, as by using a water slurry on a flexible backing such as cloth pads or rollers. The powder may be washed off and the surface coated with a solution of the polarizable material. The film of solution is evaporated to bring it first into the nematic state and then quickly and quietly to solidify the film. This solidified film is then thoroughly dried, e. g. for twenty-four hours at 100° C., which reduces its weight to 15% of the initial solid weight without any reduction in polarizing effect. The binder alone or on the other layer of glass should then be applied without further exposure to moisture. Advantageously the binder and cover sheet are also freed of moisture before the assembly. Evacuation of air may be used. In any event the assembly is subjected to pressure, suitable plasticizing conditions—such as heat or a plasticizing agent—being present if the binder is not already in an adhesive condition.

In another form of procedure the surface of the glass is first cleaned, for example, by dipping it in a concentrated solution of 100 parts by weight of potassium bichromate and 70 parts concentrated sulphuric acid 66° Baumé. After ten minutes the adhering chemical is washed off. The surface is then wiped dry with clean absorbent paper or a cloth, rubbing along the lines of the desired orientation, or the surface may be dried by evaporation if subsequent rubbing treatment is carried out for orientation, for example, by a buffing wheel, e. g., of cotton or wool cloth, or felt, or paper. The direction of rubbing, or in the case of the buffing wheel the plane of the wheel, in this treatment will always be kept parallel to the lines of orientation desired. It is this rubbing which produces the desired orientation and controls the plane of polarization of the resulting polarizing surface. To this rubbed surface I now apply a film of the polarizable material which may be, for example, a solution consisting of twenty parts by weight of methylene blue (zinc free) dye in one hundred parts of methyl alcohol and expose it to a gentle current of dry air of relative humidity below 30%, which flows uniformly across the surface. The air temperature may be, for example, between 50° F. and 80° F., and the air speed is preferably regulated so that each point on the film dries in about three seconds after it comes into the dry air stream.

An example of the application of this invention is in the field of optical lenses for various purposes, including eye-glasses, goggles, binoculars, telescopes, cameras, windshields, windows, mirrors, light valves and polarizing filters, etc. Where the optical element is made of two transparent parts fitted together, as in the case of lenses corrected for chromatic aberration, shatter-proof glass windows, etc., the polarizing film may be applied to the surface of the glass which is to be covered by the other piece, so that this film is sandwiched between the two pieces of glass and is protected thereby. In the case of accurate lenses, the film will ordinarily be applied relatively thin to a treated glass surface without other materials such as resin or other lacquer ingredients. In the case of shatter-proof windows, etc., polarizing material may be juxtaposed to a resin, cellulosic lacquer, or other resinous film which may form the flexible cementing layer within the two layers of glass; and it is an important advantage of my invention that it is thus possible to include the polarizing material in such standard optical construction without excessive thickness of binder and polarizing layers.

For a fuller understanding of the nature and objects of the invention, reference should be had to the accompanying drawings, in which:

Figure 1 is a fragmentary transverse sectional view of a polarizing assembly embodying the invention;

Figure 2 is a similar section of a portion of Figure 1, but greatly magnified;

Proportionate thicknesses somewhat distorted for clearer showing.

The assembly exemplified in Fig. 1 comprises a layer 10 of glass having a polarizing layer 11 directly adhering thereto and bound by a resinous binder 12, as, for example, polyvinyl butyral, to a second layer 13 of glass. This construction is much more effective as a polarizer than the conventional assembly wherein resin is provided on both sides of the polarizing material, and, when properly formed, is adequate in cohesive strength and of high quality generally.

The assembly exemplified in Fig. 1 and other assemblies such as contemplated by the invention may be formed, illustratively, as follows. A glass plate is fed by conveyor means under a buffing roller to which a water slurry of finely divided calcium carbonate is applied, e. g. from a drip trough. Following a washing spray and a drying step, there is applied a spray of the polarizing dye solution such, for example, as an aqueous solution of Resorcin Brown with Benzo Fast Blue 2 GL in 3% solution with equal proportion of this dye by weight, which is allowed to dry so as to pass through the nematic state and solidify. This is further dried to a stable moisture content in an oven maintained at 110° C. It is cooled to room temperature, treated with a 30% solution of $AlCl_3$ with 2% $Ca(OH)_2$ or with a cationic wetting agent e. g., a higher alkyl quaternary amine salt, such as that sold by DuPont under the designation "QB" which is represented by the manufacturer to be lorol trimethyl ammonium bromide; "lorol" representing a technical mixture of long chain alkyls, with lauryl predominating, which are present in and derived from coconut oil. After this, it is again dried to stable condition in the oven at 110° C. and then passed through a coating machine by which is applied a thin film of a 4% solution of polyvinyl butyral in isopropanol. This solution is dried and the second glass plate (also dried in the oven at 110° C.) is laid over the binder and the whole subjected to pressure, first between rollers and then in a laminating press in which the platens are first heated to soften the binder and then cooled to set it.

The procedure may be variously modified, one such modification being as follows. In this instance the binder layer, such as cellulose acetate is adhered to the surface of one of the glass plates, suitably dried, and the polarizing layer is formed on the other glass plate, also thoroughly dried, in the manner indicated above. The assembly is compressed, as between platens of a press with heating to soften the binder layer and subsequent cooling to set it.

As employed herein the term "sheet" and the like includes plates, curved lenses, and various geometric bodies having surfaces between which a layer of polarizing material and a layer of binder may be assembled.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

I claim:

1. A laminated light-polarizing article which comprises a pellucid base at least one face of which is anisotropic and oriented to the lines of polarization, a film of polarizing substance the molecules of which are oriented to the anisotropy of said base and in strongly adherent direct attractive relation to said face, which film is formed by applying dye liquid to said base and bringing it into solid form by passing it through the nematic phase so that molecules of the dye are oriented, a pellucid cover the inner face of which conforms in shape to said face of the base and an adhesive binder cementing said cover to said polarizing film.

2. A laminated light-polarizing article as defined in claim 1 in which the adhesive binder is anisotropic.

3. A laminated light-polarizing article as defined in claim 2 in which the polarizing film and the adhesive binder are substantially free from oriented non-polarizing material capable of acting as a fractional wave plate to alter the character of light polarized by said polarizing substance.

4. A laminated light-polarizing article as defined in claim 1 in which the polarizing substance is a dehydrated dye of a character which goes through the nematic phase.

5. The method of forming a polarizing assembly which comprises providing on a base of solid pellucid material in directly and strongly adherent attractive relation thereto a film of oriented dichroic dye by applying a dye liquid to said base and bringing it into solid form by passing it through a nematic phase in which molecules of the dye are oriented in the nematic phase, which orientation is preserved in the solidified material, dehydrating said dye film to a condition in which it is receptive to a resinous binder, applying a binder to the film while in such dehydrated condition, applying a cover plate of solid pellucid material to the binder, and pressing said plate against said base while the binder is in a tacky adhesive condition.

6. The method of forming a polarizing assembly which comprises frictionally orienting the molecules at the surface of a piece of solid pellucidal material, applying to said surface a film of dichroic dye material in a liquid solution which passes through a nematic phase wherein dye molecules are oriented in conformity with the orientation of the molecules of said surface, drying said film to fix the nematic orientation, dehydrating it at elevated temperature in an atmosphere having lower vapor pressure than that of said film, applying to the resulting oriented polarizable material a resinous binder and another piece of glass, having its surface fitted to that of the first piece, and pressing said glasses together.

JOHN F. DREYER.

REFERENCES CITED

The following references are of record in the file of this patent:

UNITED STATES PATENTS

| Number | Name | Date |
| --- | --- | --- |
| 1,873,951 | Zocher | Aug. 30, 1932 |
| 2,158,130 | Land | May 16, 1939 |
| 2,220,111 | Marks | Nov. 5, 1940 |
| 2,237,565 | Land | Apr. 8, 1941 |
| 2,263,249 | Rogers | Nov. 18, 1941 |
| 2,356,252 | Land | Aug. 22, 1944 |
| 2,397,242 | Chubb | Mar. 26, 1946 |
| 2,398,506 | Rogers | Apr. 16, 1946 |
| 2,400,877 | Dreyer | May 28, 1946 |